US005715973A

United States Patent [19]

Foster et al.

[11] Patent Number: 5,715,973

[45] Date of Patent: Feb. 10, 1998

[54] MANUALLY OPERATED FLUID PUMP FOR DISPENSING LOTION AND THE LIKE

[75] Inventors: Donald D. Foster, St. Charles; Philip L. Nelson, Ellisville, both of Mo.

[73] Assignee: Contico International, Inc., St. Louis, Mo.

[21] Appl. No.: 595,077

[22] Filed: Feb. 1, 1996

[51] Int. Cl.[6] .............................. B05B 11/00; B67D 5/42; G01F 11/04

[52] U.S. Cl. .............................. 222/153.13; 222/321.9; 222/384

[58] Field of Search .............................. 222/153.13, 321.3, 222/321.7, 321.9, 375, 384, 385

[56] References Cited

U.S. PATENT DOCUMENTS

| | | | |
|---|---|---|---|
| 2,772,116 | 11/1956 | Dobkin . | |
| 3,228,347 | 1/1966 | Corsette . | |
| 3,237,571 | 3/1966 | Corsette . | |
| 3,257,961 | 6/1966 | Schlenker . | |
| 3,282,472 | 11/1966 | Roder | 222/321.9 |
| 3,359,917 | 12/1967 | Cooprider . | |
| 3,361,078 | 1/1968 | Cooprider | 222/153.13 X |
| 3,362,343 | 1/1968 | Duda . | |
| 3,391,647 | 7/1968 | Corsette et al. . | |
| 3,583,605 | 6/1971 | Corsette . | |
| 4,065,038 | 12/1977 | Magers et al. . | |
| 4,252,507 | 2/1981 | Knickerbocker . | |
| 4,286,736 | 9/1981 | Corsette | 222/312.9 X |
| 4,325,500 | 4/1982 | Shay . | |
| 4,325,501 | 4/1982 | Shay . | |
| 4,371,097 | 2/1983 | O'Neill | 222/321.7 |
| 4,375,266 | 3/1983 | Magers . | |
| 4,435,135 | 3/1984 | Knickerbocker . | |
| 4,524,888 | 6/1985 | Tada . | |
| 4,692,103 | 9/1987 | Anderson . | |
| 5,016,780 | 5/1991 | Moretti | 222/153.13 |
| 5,242,089 | 9/1993 | Knickerbocker et al. | 222/321.7 |
| 5,267,673 | 12/1993 | Crosnier et al. . | |
| 5,271,513 | 12/1993 | Crosnier et al. . | |
| 5,332,325 | 7/1994 | Crosnier et al. . | |
| 5,339,972 | 8/1994 | Crosnier et al. . | |
| 5,401,148 | 3/1995 | Foster et al. . | |
| 5,465,880 | 11/1995 | Glynn . | |
| 5,476,197 | 12/1995 | Lawrence et al. | 222/321.7 |
| 5,524,793 | 6/1996 | O'Neill | 222/384 X |
| 5,549,223 | 8/1996 | Hori | 222/321.3 X |

FOREIGN PATENT DOCUMENTS

| | | |
|---|---|---|
| WO96/14938 | 5/1996 | WIPO . |

*Primary Examiner*—Kevin P. Shaver
*Attorney, Agent, or Firm*—Howell & Haferkamp, L.C.

[57] ABSTRACT

A manually operated reciprocating fluid pump comprising a pump housing, a plunger, a piston and a priming valve. The pump housing has an inner surface and a pump chamber defined at least in part by the inner surface. The pump chamber extends axially through the pump housing. The plunger is extends axially downwardly into the pump chamber. The piston is on the plunger and is reciprocally and axially slidable within the pump chamber between a bottom stroke position and a top stroke position. The priming valve is mounted on the plunger radially inwardly of the piston for movement with the plunger. It is configured to be open and thereby permit fluid to flow upward through the pump chamber when the piston stroke moves the piston downward from the top stroke position toward the bottom stroke position and configured to be closed and thereby prevent fluid from flowing upward through the pump chamber when the piston stroke moves the piston upward. A sealing plug is moveable with the plunger and is configured to seat against and seal closed the pump chamber when the piston is in its bottom stroke position to prevent fluid from flowing upward through the pump chamber. It is configured to be unseated from the pump chamber when the piston is positioned above its bottom stroke position. The priming valve and sealing plug are mounted on the plunger in a manner to prevent axial movement of the priming valve and sealing plug relative to the plunger.

23 Claims, 1 Drawing Sheet

MANUALLY OPERATED FLUID PUMP FOR DISPENSING LOTION AND THE LIKE

BACKGROUND OF THE INVENTION

This invention relates to a manually operated reciprocating fluid pump for dispensing lotions and other liquids.

A conventional reciprocating liquid pump for a lotion-type dispenser typically includes a plunger with a dispensing head that is manually reciprocated downwardly into a pump housing connected to a liquid container, a spring for biasing the plunger upwardly out of the pump housing, a priming valve, and a check valve. The priming valve unseats (opens) on the downward movement of the plunger into the pump housing to allow air in the empty pump housing to escape through the plunger and dispensing head, and then seats (closes) on the return stroke of the plunger upwardly out of the pump housing to draw liquid in the container up into the pump housing. The check valve seats on the downward movement of the plunger to prevent air or any liquid contained in the pump housing from being forced back into the container, and then unseats on the upward movement of the plunger to allow the vacuum created in the pump housing by the plunger's upward movement to draw liquid from the container past the check valve into the pump housing.

Often, ball valves are used for both the priming valve and check valve in manually reciprocated liquid pumps. However, the functioning of ball valves is dependent on gravitational forces which direct the ball of the valve downwardly to its seated position. If a liquid container having a reciprocating pump with ball valves is moved from its upright orientation, e.g., if it is placed on its side or inverted during shipment, gravity no longer seats the ball valves and the liquid in the container can pass through and leak from the pump.

Reciprocating plunger pumps have been designed in a variety of constructions to prevent the pumps from leaking when the liquid container to which they are attached is positioned on its side or inverted. However, many of these designs require an elaborate construction of the reciprocating plunger pump to prevent its leaking and often require additional component parts to be added to the pump which increase its cost of production.

SUMMARY OF THE INVENTION

Among the several objects of the present invention may be noted the provision of an improved lotion dispenser; the provision of such a dispenser having a priming valve which is operable regardless of whether the dispenser is placed upright, inverted, or on its side; the provision of such a dispenser configured to prevent leakage when the dispenser is inverted or placed on its side; and the provision of such a dispenser which is of relatively simple construction.

In general, a manually operated reciprocating fluid pump of the present invention comprises a pump housing and a plunger. The pump housing has an inner surface and a pump chamber defined at least in part by the inner surface. The pump chamber extends axially through the pump housing. The plunger is configured for extending axially downwardly into the pump chamber of the pump housing. The plunger has a fluid passageway extending generally axially therethrough.

A piston is on the plunger and is slidable within the pump chamber. It is configured for sealing engagement with the inner surface of the pump housing all around the piston to seal against leakage of fluid between the inner surface of the pump housing and the piston. The piston is reciprocally and axially slidable within the pump chamber between a bottom stroke position and a top stroke position, the top stroke position being spaced axially above the bottom stroke position.

A priming valve is mounted on the plunger radially inwardly of the piston for movement with the plunger. The priming valve is configured to be open and thereby permit fluid to flow upward through the pump chamber when the piston stroke moves the piston downward from the top stroke position toward the bottom stroke position, and is configured to be closed and thereby prevent fluid from flowing upward through the pump chamber when the piston stroke moves the piston upward from the bottom stroke position toward the top stroke position.

A sealing plug is moveable with the plunger. The sealing plug is configured to seat against and seal closed the pump chamber when the piston is in its bottom stroke position to prevent fluid from flowing upward through the pump chamber. The sealing plug is configured to be unseated from the pump chamber when the piston is positioned above its bottom stroke position. The priming valve and sealing plug are mounted on the plunger in a manner to prevent axial movement of the priming valve and sealing plug relative to the plunger.

In another aspect of the present invention, a dispenser comprises a pump housing and plunger. The pump housing has an inner surface, a pump chamber defined at least in part by the inner surface, an intake port adapted for fluid communication with a source of fluid, and an intake fluid flow path providing fluid communication between the intake port and pump chamber. The plunger is configured for extending axially downwardly into the pump chamber of the pump housing. The plunger has a discharge fluid passageway extending generally axially therethrough and a downwardly extending protrusion.

A piston is on the plunger and is slidable within the pump chamber, It is configured for sealing engagement with the inner surface of the pump housing all around the piston to seal against leakage of fluid between the inner surface of the pump housing and the piston, The piston is reciprocally and axially slidable within the pump chamber between a bottom stroke position and a top stroke position, The top stroke position is spaced axially above the bottom stroke position, The piston and pump chamber define a variable volume fluid receiving cavity, The fluid receiving cavity has a first volume $V_1$ when the piston is in its top stroke position and a second volume $V_2$ smaller than the first volume $V_1$ when the piston is in its bottom stroke position, A priming valve is mounted on the plunger radially inwardly of the piston for movement with the plunger, It has a resilient tubular portion and is moveable between a closed position in which the resilient tubular portion sealingly engages the protrusion all around the tubular portion to block fluid communication between the discharge fluid passageway of the plunger and the fluid receiving cavity and an open position in which at least a part of the tubular portion flexes generally radially outwardly away from the protrusion to thereby provide a gap between the tubular portion and protrusion for fluid communication between the fluid receiving cavity and the discharge fluid passageway of the plunger.

Other objects and features will be in part apparent and in part pointed out hereinafter.

BRIEF DESCRIPTION OF THE DRAWING

Corresponding reference characters indicate corresponding parts throughout the several views of the drawings.

DESCRIPTION OF THE PREFERRED EMBODIMENT

Figure 1:
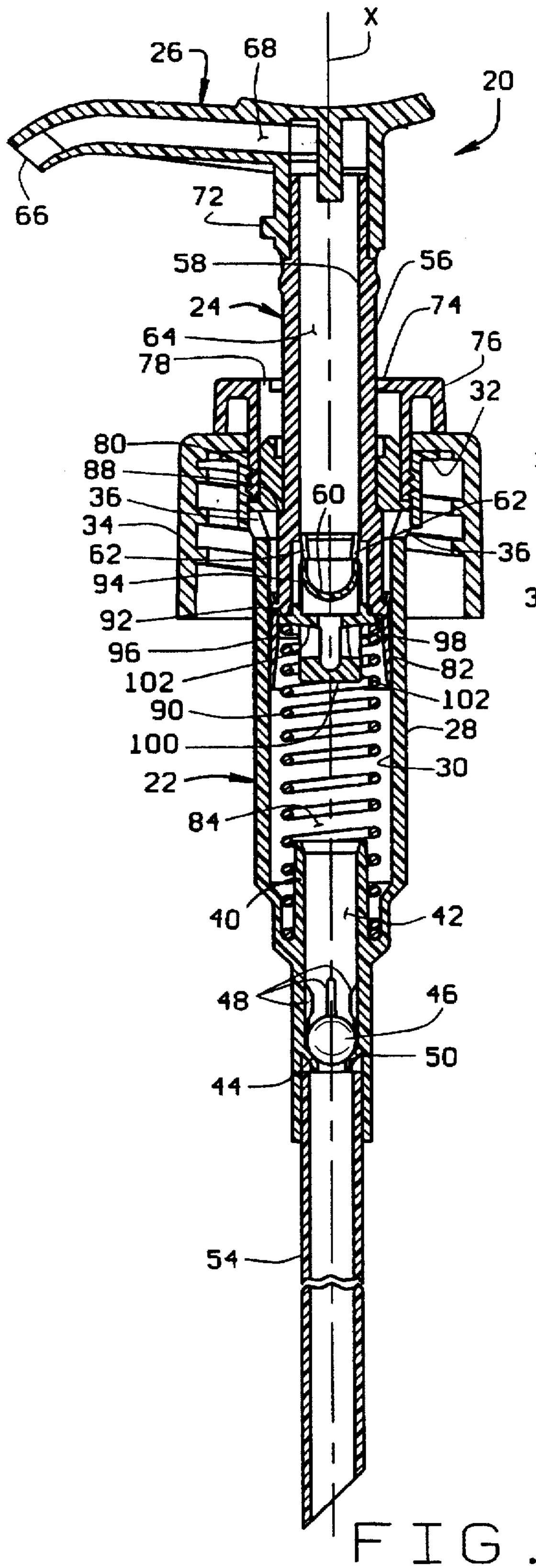
FIG. 1 is a side elevational view, in section, of a lotion dispenser of the present invention showing a piston of the dispenser in a top stroke position.

Referring now to the drawings, a lotion dispenser of the present invention is indicated in its entirety by the reference numeral 20. Although characterized as a lotion dispenser, it is to be understood that other liquids may be dispensed via the lotion dispenser 20 without departing from the scope of this invention. The lotion dispenser 20 comprises a pump housing, generally indicated at 22, a plunger, generally indicated at 24, and a lotion dispensing head, generally indicated at 26.

The pump housing 22 has a tubular, cylindrical configuration 28 with a generally cylindrical interior surface 30. A ring 32 is formed at the top of the pump housing 22 and is configured for seating on the top edge of a liquid bottle (not shown). A threaded collar (or cap) 34 is mounted on the pump housing 22 for rotation about a central axis X of the housing. The threaded collar 34 receives a threaded neck (not shown) of the bottle. A pair of vent openings 36 extend through the pump housing 22 just below the ring 32 to vent the bottle interior through the housing interior. The cylindrical interior surface 30 of the pump housing 22 defines, in part, a pump chamber 38 for receiving the plunger 24. The diameter of the pump housing 22 is reduced at its lower end and an upstanding tubular projection 40 projects upwardly from the bottom of the pump housing 22 into the pump chamber 38. A check valve chamber 42 is provided below the upstanding tubular projection 40. The check valve chamber 42 includes an annular valve seat 44, and a ball check valve 46 rests on the seat. A plurality of shoulders 48 project inwardly into the check valve chamber 42 for limiting upward movement of the ball 46. The annular valve seat 44 defines an intake port 50 of the pump housing 22 adapted for fluid communication with a source of fluid (e.g., liquid in the bottle). The check valve chamber 42 defines an intake fluid flow path providing fluid communication between the intake port 50 and the pump chamber 38. A dip tube 54 is secured to the bottom end of the pump housing 22 and is preferably configured for extending downwardly to the bottom of the bottle.

The plunger 24 is configured for extending axially downwardly into the pump chamber 38 of the pump housing 22 and has a cylindrical, tubular configuration 56 with a cylindrical interior passageway 58 therein. A downwardly extending protrusion 60 is located generally at a bottom portion of the plunger 24 and under the cylindrical interior passageway 58 of the plunger. Preferably, the protrusion 60 is generally circular in transverse cross-section (i.e., as viewed in a cross-section taken along a plane perpendicular to the axis X) and has a generally hemispherical lower end. The protrusion 60 includes lateral slits 62 therethrough for passage of liquid through the slits and into the interior passageway 58 of the plunger 24. The lateral slits 62 and the interior passageway 58 of the plunger 24 constitute a discharge fluid passageway 64 of the plunger. The lotion dispensing head 26 is secured to the top end of the plunger 24. It includes a discharge port 66 and a passageway 68 through the dispensing head 26 in fluid communication with the discharge fluid passageway 64 of the plunger 24. Because of this, liquid flowing upwardly through the plunger can flow through and be dispensed from the lotion dispensing head 26 via the discharge port 66. Although the dispenser 20 preferably has a lotion dispensing head, other heads may be employed without departing from the scope of this invention. For example, the lotion dispensing head 26 may be replaced by a spray head specifically designed to dispense liquid from the head in a spray pattern. The spray head would likely be preferred when the pump of the invention is employed in dispensing a less viscous fluid from the container.

Preferably, the dispensing head 26 has a locking tab 72 projecting laterally from one side of the head. The locking tab 72 engages beneath an annular flange 74 (FIG. 2) of a locking ring 76 secured to the upper end of the pump housing 22. The flange 74 of the locking ring 76 has an opening 78 at one position on its circumference that allows the locking tab 72 to pass therethrough. By rotating the lotion dispensing head 26 relative to the threaded cap 34 so that the locking tab 72 is aligned with the opening 78, the dispensing head and plunger 24 are free to reciprocate through a stroke movement of the plunger relative to the pump housing 22. By depressing the plunger 24 downwardly through the locking ring 78 and threaded cap 34 so that the locking tab 72 passes through the locking ring opening 78, and then by rotating the lotion dispensing head 26 so that the locking tab does not align with the opening, the plunger 24 is locked in its relative position to the pump housing 22. A sealing ring 80 is also provided between the exterior of the plunger 24 and the interior of the locking ring 76 for providing a fluid-tight seal between the interior surface 30 of the pump housing 22 and the bottle exterior.

Figure 2:
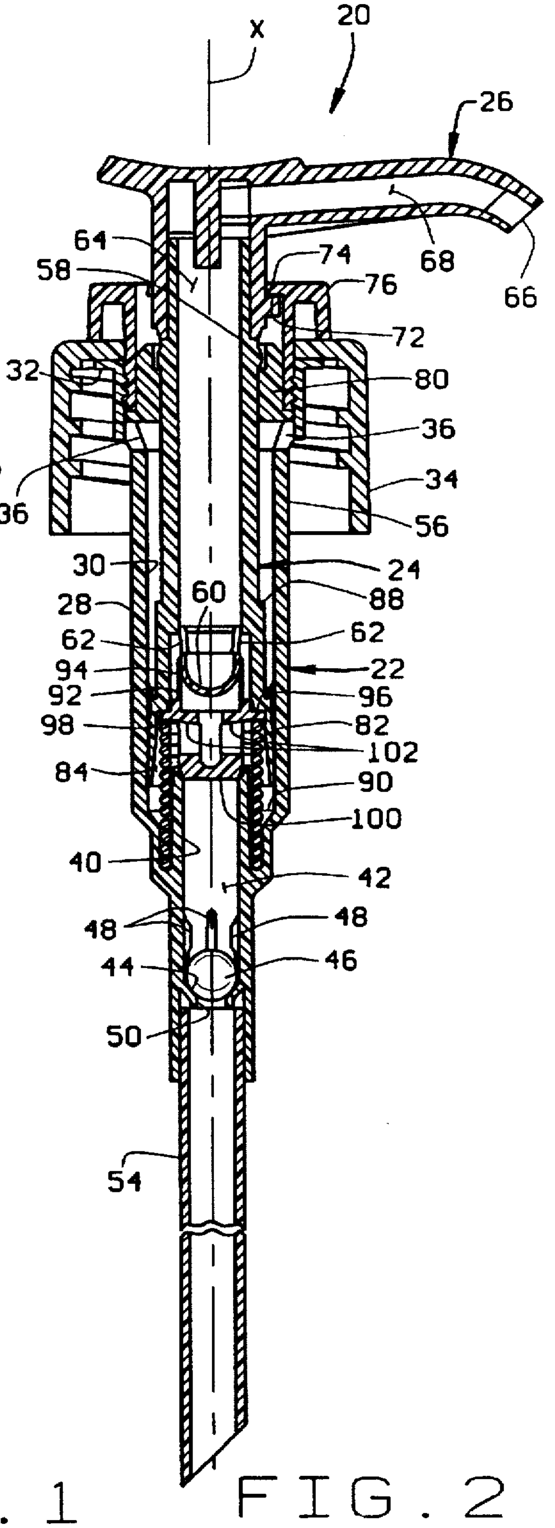
FIG. 2 is a side elevational view, in section, of the lotion dispenser of FIG. 1, showing the piston in a bottom stroke position.

A piston 82 is formed on the exterior of the plunger 24 and circumscribes the downwardly extending protrusion 60. The piston 82 is slidable within the pump chamber 38 and is configured for sealing engagement with the inner surface of the pump housing 22 all around the piston to seal against leakage of fluid between the inner surface of the pump housing and the piston. The piston 82 is reciprocally slidable within the pump chamber 38 along the axis X between a bottom stroke position (FIG. 2) and a top stroke position (FIG. 1). The piston 82 and pump chamber 38 define a variable volume fluid receiving cavity 84. The fluid receiving cavity 84 has a first volume $V_1$ when the piston 82 is in its top stroke position (FIG. 1) and has a second volume $V_2$ smaller than the first volume $V_1$ when the piston is in its bottom stroke position (FIG. 2). The discharge fluid passageway 64 of the plunger 24 and dispensing head 26 constitute a discharge fluid flow path for providing fluid communication between the fluid receiving cavity 84 and the discharge port. The plunger 24 has an annular shoulder 88 formed on its exterior surface that engages against the underside of the sealing ring 80 to limit upward movement of the plunger 24. A coil spring 90 is positioned between the bottom of the plunger 24 and the bottom of the pump chamber 38 of the pump housing 22. The spring 90 extends around the upstanding tubular projection 40 of the pump housing 22 and biases the plunger 24 upwardly to its top stroke position relative to the pump housing.

A priming valve 92 is mounted on the plunger 24 adjacent the protrusion 60 of the plunger and radially inwardly of the piston 82 for movement with the plunger. The protrusion 60 is shaped and configured for acting as a valve seat for the priming valve 92. The priming valve 92 has a resilient tubular portion 94 engageable with the protrusion 60, and an annular sealing flange 96 just below and circumscribing the tubular portion. The sealing flange 96 is configured for sealing against an annular shoulder 98 defined by the inner surface of the plunger 24 all around the sealing flange to prevent leakage of fluid therebetween. Because the priming valve 92 moves with the plunger 24, the sealing flange 96 remains sealed to the annular shoulder 98 of the plunger regardless of whether the priming valve is open or closed. Preferably, the upper end of the coil spring 90 presses upwardly against the annular sealing flange 96 to bias it in sealing engagement with the annular shoulder 98. The priming valve 92 further includes a sealing plug 100 (described in greater detail below) and lateral openings 102 through the sealing plug providing a fluid passage through the priming valve. The priming valve 92 is moveable between a closed position and an open position. In the closed position, the resilient tubular portion sealingly engages the protrusion 60 all around the tubular portion to block fluid communication between the discharge fluid passageway 64 of the plunger 24 and the fluid receiving cavity 84. In the open position, at least a part of the tubular portion 94 flexes generally radially outwardly away from the protrusion 60 to thereby provide a gap between the tubular portion and protrusion for fluid communication between the fluid receiving cavity 84 and the discharge fluid passageway 64 of the plunger 24.

The sealing plug 100 and priming valve 92 are of a single unitary piece and preferably formed of an elastomeric material. The sealing plug 100 is configured to seat against and seal closed the upstanding tubular projection 40 of the pump housing 22 when the piston 82 is in its bottom stroke position to prevent fluid from flowing upward through the pump chamber 38. When the piston 82 is positioned above its bottom stroke position, the sealing plug 100 is spaced above the upstanding tubular projection 40 of the pump housing 22 and is therefore unseated therefrom.

The liquid pumping and dispensing operation of the lotion dispenser 20 is similar to that of conventional reciprocating pumps. Manually depressing the lotion dispensing head 26 downwardly causes the plunger 24 and piston 82 to move downwardly to the bottom stroke position. This downward movement causes the resilient tubular portion 94 of the priming valve 92 to flex radially outwardly to open the priming valve and thereby permit fluid, whether air when initially priming the pump or the container liquid after the pump has been primed, to pass from the check valve chamber 42 through the priming valve through the lateral slits 62 of the protrusion 60 into the discharge fluid passageway 64 of the plunger 24 and out the discharge port 66 of the lotion dispensing head. Releasing the manual force on the lotion dispensing head 26 allows the coil spring 90 to push the plunger 24 and piston 82 upwardly to the top stroke position. This upward movement creates a vacuum in the fluid receiving cavity 84 which unseats the check valve ball 46 and draws liquid up the dip tube 54 through the check valve chamber 42 and into the fluid receiving cavity 84. This vacuum also forces the resilient tubular portion 94 of the priming valve 92 radially inwardly to close the priming valve. By continued reciprocating movement of the plunger 24 relative to the pump housing 22, the liquid is continued to be drawn from the container and dispensed through the dispensing head 26.

When the plunger 24 and piston 82 are in their bottom stroke positions and when the dispensing head 26 is locked to the collar 34 as shown in FIG. 2, the plug 100 seats against the upstanding tubular projection to block flow of fluid through the dispenser 20. In this position, liquid will not leak from the dispenser 20 even if the dispenser is tilted or inverted.

In view of the above, it will be seen that the several objects of the invention are achieved and other advantageous results attained.

As various changes could be made in the above construction without departing from the scope of the invention, it is intended that all matter contained in the above description or shown in the accompanying drawings shall be interpreted as illustrative and not in a limiting sense. The invention therefore shall be limited solely by the scope of the claims set forth below.

What is claimed is:

1. A manually operated reciprocating fluid pump comprising:

a pump housing having an inner surface and a pump chamber defined at least in part by the inner surface, said pump chamber extending axially through the pump housing;

a plunger configured for extending axially downwardly into the pump chamber of the pump housing, the plunger having a fluid passageway extending generally axially therethrough;

a piston on the plunger and slidable within the pump chamber, the piston being configured for sealing engagement with the inner surface of the pump housing all around the piston to seal against leakage of fluid between the inner surface of the pump housing and the piston, the piston being reciprocally and axially slidable within the pump chamber between a bottom stroke position and a top stroke position, the top stroke position being spaced axially above the bottom stroke position;

a priming valve mounted on the plunger radially inwardly of the piston for movement with the plunger, the priming valve being configured to be open and thereby permit fluid to flow upward through the pump chamber when the piston stroke moves the piston downward from the top stroke position toward the bottom stroke position, the priming valve being configured to be closed and thereby prevent fluid from flowing upward through the pump chamber when the piston stroke moves the piston upward from the bottom stroke position toward the top stroke position; and a sealing plug moveable with the plunger, the sealing plug being configured to seat against and seal closed the pump chamber when the piston is in its bottom stroke position to prevent fluid from flowing upward through the pump chamber, the sealing plug being configured to be unseated from the pump chamber when the piston is positioned above its bottom stroke position;

the priming valve and sealing plug being mounted on the plunger in a manner to prevent axial movement of the priming valve and sealing plug relative to the plunger.

2. A pump as set forth in claim 1 wherein the priming valve and sealing plug are of a single unitary piece.

3. A pump as set forth in claim 1 wherein the plunger includes a downwardly extending protrusion and wherein the priming valve includes an upwardly-extending resilient tubular portion configured for sealingly engaging the protrusion all around the tubular portion when the valve is closed and configured so that at least a part of the tubular portion flexes generally radially outwardly away from the protrusion to thereby provide a gap between the tubular portion and protrusion when the valve is open.

4. A pump as set forth in claim 3 wherein the protrusion is generally circular in transverse cross-section.

5. A pump as set forth in claim 3 wherein the priming valve further includes an annular flange adjacent to and below the tubular portion, the annular flange being configured to sealingly engage a portion of the plunger all around the flange regardless of whether the priming valve is open or closed to prevent leakage of fluid between the annular flange and said plunger portion.

6. A pump as set forth in claim 5 wherein the portion of the plunger engageable with the annular flange of the priming valve comprises an annular shoulder.

7. A pump as set forth in claim 5 further comprising a spring at least partially within the pump chamber and engageable with the annular flange to bias the flange in sealing engagement with said plunger portion.

8. A pump as set forth in claim 7 wherein said spring is configured for urging the piston toward its top stroke position.

9. A pump as set forth in claim 5 wherein the piston and pump chamber define a variable volume fluid receiving cavity, the fluid receiving cavity having a first volume $V_1$ when the piston is in its top stroke position and having a second volume $V_2$ smaller than the first volume $V_1$ when the piston is in its bottom stroke position, the pump further comprising a dispenser head operatively connected to the plunger, a discharge port in the dispenser head, and a discharge fluid flow path defined at least in part by the plunger and dispenser head for providing fluid communication between the fluid receiving cavity and discharge port.

10. A pump as set forth in claim 9 wherein the inner surface of the tubular portion of the priming valve in part defines the fluid receiving cavity and wherein the outer surface of the tubular portion in part defines the discharge fluid flow path.

11. A pump as set forth in claim 9 wherein the pump housing further comprises an intake port and an intake fluid flow path providing fluid communication between the intake port and the fluid receiving cavity, the pump further comprising a check valve in the intake fluid flow path configured for permitting fluid flow from the intake port to the fluid receiving cavity and for checking fluid flow from the fluid receiving cavity to the intake port.

12. A dispenser comprising:

a pump housing having an inner surface, a pump chamber defined at least in part by the inner surface, an intake port adapted for fluid communication with a source of fluid, and an intake fluid flow path providing fluid communication between the intake port and pump chamber;

a plunger configured for extending axially downwardly into the pump chamber of the pump housing, the plunger having a discharge fluid passageway extending generally axially therethrough and a downwardly extending protrusion;

a piston on the plunger and slidable within the pump chamber, the piston being configured for sealing engagement with the inner surface of the pump housing all around the piston to seal against leakage of fluid between the inner surface of the pump housing and the piston, the piston being reciprocally and axially slidable within the pump chamber between a bottom stroke position and a top stroke position, the top stroke position being spaced axially above the bottom stroke position, the piston and pump chamber defining a variable volume fluid receiving cavity, the fluid receiving cavity having a first volume $V_1$ when the piston is in its top stroke position and having a second volume $V_2$ smaller than the first volume $V_1$ when the piston is in its bottom stroke position; and a priming valve mounted on the plunger radially inwardly of the piston for movement with the plunger, the priming valve having a resilient tubular portion, the priming valve being moveable between a closed position in which the resilient tubular portion sealingly engages the protrusion all around the tubular portion to block fluid communication between the discharge fluid passageway of the plunger and the fluid receiving cavity and an open position in which at least a part of the tubular portion flexes generally radially outwardly away from the protrusion to thereby provide a gap between the tubular portion and protrusion for fluid communication between the fluid receiving cavity and the discharge fluid passageway of the plunger.

13. A dispenser as set forth in claim 12 further comprising a sealing plug moveable with the plunger, the sealing plug being configured to seat against and seal closed the pump chamber when the piston is in its bottom stroke position to prevent fluid from flowing from the intake fluid flow path into the pump chamber, the sealing plug being configured to be unseated from the pump chamber when the piston is positioned above its bottom stroke position.

14. A dispenser as set forth in claim 13 wherein the intake fluid flow path is defined at least in part by an upstanding tubular projection of the pump housing, the sealing plug being configured to seat against and seal closed the upstanding tubular projection when the piston is in its bottom stroke position.

15. A dispenser as set forth in claim 13 wherein the priming valve and sealing plug are mounted on the plunger in a manner to prevent axial movement of the priming valve and sealing plug relative to the plunger.

16. A dispenser as set forth in claim 13 wherein the priming valve and sealing plug are of a single unitary piece.

17. A dispenser as set forth in claim 12 wherein the downwardly extending protrusion of the plunger is generally circular in transverse cross-section.

18. A dispenser as set forth in claim 12 wherein the priming valve further includes an annular flange adjacent to and below the tubular portion, the annular flange being configured to sealingly engage a portion of the plunger all around the flange regardless of whether the priming valve is in its open or closed position to prevent leakage of fluid between the annular flange and said plunger portion.

19. A dispenser as set forth in claim 18 wherein the portion of the plunger engageable with the annular flange of the priming valve comprises an annular shoulder.

20. A dispenser as set forth in claim 18 further comprising a spring at least partially within the pump chamber and engageable with the annular flange to bias the flange in sealing engagement with said plunger portion.

21. A dispenser as set forth in claim 20 wherein said spring is configured for urging the piston toward its top stroke position.

22. A dispenser as set forth in claim 12 wherein the inner surface of the tubular portion of the priming valve in part defines the fluid receiving cavity and wherein the outer surface of the tubular portion in part defines the discharge fluid flow path.

23. A dispenser as set forth in claim 12 wherein the pump further comprises a check valve in the intake fluid flow path configured for permitting fluid flow from the intake port to the fluid receiving cavity and for checking fluid flow from the fluid receiving cavity to the intake port.

* * * * *